(12) United States Patent
Crawford et al.

(10) Patent No.: US 9,556,959 B2
(45) Date of Patent: Jan. 31, 2017

(54) WEAR-PROTECTIVE SLEEVE

(75) Inventors: John P Crawford, Crystal Lake, IL (US); Juergen Kurth, Odenthal (DE)

(73) Assignee: AKTIEBOLAGET SKF, Gothenburg (SE)

( * ) Notice: Subject to any disclaimer, the term of this patent is extended or adjusted under 35 U.S.C. 154(b) by 480 days.

(21) Appl. No.: 13/576,526

(22) PCT Filed: Jan. 10, 2011

(86) PCT No.: PCT/EP2011/050207
§ 371 (c)(1),
(2), (4) Date: Oct. 12, 2012

(87) PCT Pub. No.: WO2011/095371
PCT Pub. Date: Aug. 11, 2011

(65) Prior Publication Data
US 2013/0200576 A1    Aug. 8, 2013

(30) Foreign Application Priority Data
Feb. 5, 2010   (DE) ........................ 10 2010 007 010

(51) Int. Cl.
*F16J 15/32*        (2016.01)

(52) U.S. Cl.
CPC ............... *F16J 15/32* (2013.01); *F16J 15/324* (2013.01); *F16J 15/3256* (2013.01); *F16J 15/3264* (2013.01); *F16J 15/3272* (2013.01)

(58) Field of Classification Search
USPC .................. 277/571, 500, 634, 527; 299/104
See application file for complete search history.

(56) References Cited

U.S. PATENT DOCUMENTS

| | | | |
|---|---|---|---|
| 3,101,954 A * | 8/1963 | Huddle | 277/571 |
| 3,332,536 A | 7/1967 | Ebly et al. | |
| 3,391,940 A * | 7/1968 | Baugh | 277/565 |
| 3,920,254 A * | 11/1975 | Johnston et al. | 277/462 |
| 3,960,243 A * | 6/1976 | Di Antonio | 184/6 |
| 4,253,675 A * | 3/1981 | St. Laurent, Jr. | 277/504 |
| 4,432,557 A * | 2/1984 | Druckenhengst | 277/351 |
| 4,516,481 A * | 5/1985 | Geffroy et al. | 92/212 |

(Continued)

FOREIGN PATENT DOCUMENTS

| | | |
|---|---|---|
| DE | 10201013 A1 | 7/2003 |
| JP | H04123253 U | 11/1992 |

(Continued)

*Primary Examiner* — Kristina Fulton
*Assistant Examiner* — Eugene G Byrd
(74) *Attorney, Agent, or Firm* — Bryan Peckjian; SKF USA Inc. Patent Dept.

(57) ABSTRACT

A sleeve is configured to be fitted onto a rotating shaft and the sleeve includes a tubular portion extending in an axial direction and having a cylindrical-shaped sealing guide surface configured to contact a radial shaft seal. A flange extends outward from the tubular portion at least substantially in a radial direction that is perpendicular to the axial direction. A first target break line is defined between the tubular portion and the flange and is configured to facilitate separation of the flange from the tubular portion. Further, a second target break line is defined in or on the flange and is configured to facilitate tearing of the flange at least substantially in the radial direction of the flange up to the first target break line.

9 Claims, 5 Drawing Sheets (56) References Cited

U.S. PATENT DOCUMENTS

| | | | | |
|---|---|---|---|---|
| 4,643,436 | A * | 2/1987 | Jackowski | 29/527.1 |
| 5,188,214 | A * | 2/1993 | Uttke et al. | 198/501 |
| 5,350,181 | A * | 9/1994 | Horve | 277/559 |
| 5,997,005 | A * | 12/1999 | Gold et al. | 277/402 |
| 6,139,027 | A * | 10/2000 | Biekx | 277/634 |
| 6,170,833 | B1 * | 1/2001 | Cox et al. | 277/551 |
| 6,220,600 | B1 * | 4/2001 | Tripathy et al. | 277/309 |
| 6,270,082 | B1 * | 8/2001 | Hegemier | 277/502 |
| 6,354,598 | B1 * | 3/2002 | Huang | 277/551 |
| 7,314,219 | B1 * | 1/2008 | Horvath et al. | 277/551 |
| 7,931,278 | B2 * | 4/2011 | Krulis et al. | 277/563 |
| 8,197,685 | B2 * | 6/2012 | Ribet et al. | 210/230 |
| 8,388,230 | B2 * | 3/2013 | Kulkarni et al. | 384/477 |
| 2006/0186607 | A1 * | 8/2006 | Shih et al. | 277/634 |
| 2007/0290402 | A1 * | 12/2007 | Edwards | B29C 37/0075 264/259 |
| 2008/0054572 | A1 * | 3/2008 | Maskaliunas | 277/551 |
| 2008/0224420 | A1 * | 9/2008 | Hansen | 277/634 |

FOREIGN PATENT DOCUMENTS

| | | | |
|---|---|---|---|
| JP | 2000337392 A | 12/2000 | |
| WO | WO2007146381 A2 | 12/2007 | |

* cited by examiner

WEAR-PROTECTIVE SLEEVE

CROSS-REFERENCE

This application is the U.S. National Stage of International Application No. PCT/EP2011/050207 filed on Jan. 10, 2011, which claims priority to German patent application no. 10 2010 007 010.6 filed on Feb. 5, 2010.

TECHNICAL FIELD

The invention relates to a wear-protective sleeve including an axially extending sleeve section having a cylindrical sealing guide surface, a flange section extending radially away from the sleeve section and a target break section connecting the sleeve section to the flange section to facilitate the separation of the flange section from the sleeve section.

RELATED ART

JP 2000-337392 describes a metal sleeve, which is to be mounted on an outside surface of a shaft and has a cylindrical section and a flange. The outer surface is hardened, so that it has protective properties against wear. The metal sleeve is fitted onto the shaft by hitting the flange. A circumferential, groove-shaped target break line extends between the cylindrical section and the flange, so that after the fitting of the metal sleeve onto the shaft, the flange can be removed, and only the cylindrical section, which has the hardened surface, still remains on the shaft.

SUMMARY

In one aspect of the present teachings a wear-protective sleeve is disclosed, wherein the detachability of a flange portion from a sleeve portion is improved.

In another aspect of the present teachings, a wear-protective sleeve includes an axially extending sleeve section having a cylindrical sealing guide surface, a flange section extending radially away from the sleeve section, a target break section connecting the sleeve section to the flange section to facilitate the separation of the flange section from the sleeve section, and a tearing apparatus provided on the flange section to facilitate the radial tearing of the flange section up to the target break section.

Wear-protective sleeves can be manufactured from thin-walled and/or corrosion-resistant steel, and are used for example either in the context of a repair of worn or damaged mating surfaces or as original equipment of shafts. The wear-protective sleeves have at least one sealing guide surface. In particular for sealing lips of radial shaft sealing rings, the wear-protective sleeves can have at least one outwardly facing sealing guide surface. In other words the at least one sealing guide surface is formed in this case by the outer surface of the sleeve section. The wear-protective sleeves can have a radially oriented, in particular a radially outwardly oriented, flange section, which serves for the mounting of the wear-protective sleeve. Using the flange, the wear-protective sleeve can be fitted onto a shaft, in particular by superimposing and in particular in a cold state. A fitting can take place by striking, in particular by hammer strikes onto a striking cap. The striking cap can for example be formed as a simple piece of pipe, which abuts on the flange and is driven forward with the flange of the wear-protective sleeve onto the shaft end. By striking the striking cap and thereby the flange, a sleeve section of the wear-protective sleeve, which has the mating surface or the sealing guide surface, is pulled with the flange onto the shaft.

Depending on operating condition and space condition, it is desirable to remove the flange after the mounting of the wear-protective sleeve. For this purpose, a groove is introduced as a target break line and/or as an axial boundary of the running surface between the sleeve section and the flange or flange section of the wear-protective sleeve.

To remove the flange after the mounting of the wear-protective sleeve, the flange is previously pre-damaged with pliers or sheet metal shears in such a way that it tears into the circumferential groove. The entire flange can then, separating along this groove, be removed from the sleeve section. Here appropriate care must be taken to avoid damage to the sealing running surface and thereby potentially-caused failures of the radial shaft seal.

As the wear-protective sleeve has a tearing apparatus on the flange section to facilitate the radial tearing of the flange section up to the target break section, the flange section can be better detached from the sleeve section. Thus, the risk of a damaging of the sealing running surface can also be reduced.

The tearing apparatus can be formed by one or more cutouts, wall thickness reductions and/or material changes in the wear-protective sleeve or the flange section. The one or more cutouts, wall thickness reductions and/or material changes can be provided on both surfaces of the flange section, alternatively only on the surface facing towards the sleeve section, or only on the opposite surface, which faces away from the sleeve section. A preferred tear line is prescribed by the tearing apparatus, along which the flange section in particular of a circumferential edge of the flange section beginning up to the target break section, which serves to facilitate the separation of the flange section from the sleeve section, can be torn. The flange ring, which is open after the tearing, can then be pulled off along the target break section of the sleeve section of the wear-protective sleeve. Thus in other words the flange ring, which is open after the tearing, can be, so to say, peeled from the sleeve section of the wear-protective sleeve.

The tear line can be understood to be a path, along which the flange ring should be torn off. This tear line or this path can, due to a prescribed shape or trajectory, steer the tearing of the flange in a desired direction. In the simplest case, the tear line or the path can follow along a straight route, which leads in a radial direction from the circumferential edge of the flange section to the target break section, which target break section serves to facilitate the separation of the flange section from the sleeve section. The tear line or the path can however for example also lead along a spiral-shaped path from the circumferential edge of the flange section to the target break section. Instead of a single tear line or a single path, two or more tear lines or paths can also be provided on the flange section. Multiple tear lines or paths can be disposed around the circumference of the flange section at equal intervals.

The tearing apparatus can have a reduced-wall-thickness path in the flange section, which extends in a radial direction between a circumferential edge and the target break section, in particular continuously from a circumferential edge of the flange section up to the target break section. The reduced-wall-thickness path can extend uninterrupted, i.e. continuously from a circumferential edge of the flange section to the target break section. In another design, the reduced-wall-thickness path can extend only over a part of the course from circumferential edge to target break section. A plurality of consecutive and at-a-distance-from-each-other partial paths can also extend, in a seam-like or perforated manner, between the circumferential edge and the target break section.

The reduced-wall-thickness path can be formed by a groove introduced in the flange section. In addition to a circumferential groove as the target break line, at least one second groove can be provided according to the invention, which is introduced transversely over the mounting flange up to the circumferential groove of the target break line. At this one groove or at a plurality of such grooves, which can be formed as transverse grooves, the flange can be torn through in a defined way, and this tear can further lead up to the circumferential groove of the target break line. During the manufacture of the wear-protective sleeve, the groove or the plurality of grooves can be introduced in the flange section or produced together with this flange section. The groove or the plurality of grooves can be manufactured in the same way as the target break section and/or in an analogous way to the target break section.

The groove can be a groove produced through embossing or ablating, in particular through ablation using a laser processing tool. In other words, the wear-protective sleeve is first manufactured with a constant and/or uniform wall thickness of the flange section, and subsequently the one or more reduced-wall-thickness paths or the one groove or the plurality of grooves are introduced into the surface of the flange section by plastic deformation or the removal of material. Alternatively the groove or the grooves can also simultaneously occur with the forming of the mounting flange in the shaping tool, so that a separate process step is not required. The depth of the grooves can in both cases be constant or variable over their course. The depth of the groove can for example amount to half the thickness of the wall thickness of the flange section. The depth of the groove in the flange section can correspond to the depth of the target break section, i.e. the circumferential groove between flange section and sleeve section.

Alternatively or in addition to a reduced-wall-thickness path, the tearing apparatus can have a cutout in the flange section. A plurality of reduced-wall-thickness paths and cutouts can alternate, in particular alternate in a perforated manner. A single cutout can be combined with a single reduced-wall-thickness path.

For example a single cutout can be introduced at a circumferential edge of the flange section, which cutout only extends over a part of the flange height. A reduced-wall-thickness path can connect to this cutout, which path connects the cutout with the target break section.

Alternatively a reduced-wall-thickness path can be introduced in the region of the circumferential edge, which path only extends over a part of the flange height. A cutout, in particular a slit-shaped cutout, can connect to this reduced-wall-thickness path, which cutout connects the reduced-wall-thickness path with the target break section in the region of the circumferential edge.

The cutout can be a radially extending slit, in particular an open-at-the-edge slit in the flange section. The slit can extend in a central region of the flange section. The slit can in particular extend, in a central range of the flange section, up to the target break section. Thereby the slit can be delimited by the circumferential edge of the flange by a closed wall section of the flange. In an open-at-the-edge design of the circumferential edge of the flange, the slit can extend continuously through, i.e. uninterrupted, up to the target break section. The open-at-the-edge slit is in this respect formed by an incision in the flange on the circumference-side.

In a further development the cutout can be a notch introduced in the region of a circumferential edge of the flange section. The notch can in particular be a U-shaped or V-shaped or wedge-shaped cutout. The pointed end of the wedge-shaped cutout forms a notch base.

The notch can have a notch base, to which a reduced-wall-thickness path in the flange section connects, which path leads up to the target break section. Alternatively or in addition the notch can have a notch base, to which a cutout connects, in particular a slit in the flange section, which cutout leads up to the target break section. In these cases the notch ends or the notch base is located in a central circumferential region of the flange, so that the notch base does not reach up to the target break section.

The notch can have a notch base reaching up to the target break section. Thereby the notch forms in this respect an open-at-the-edge, wedge-shaped or V-shaped slit in the form of an incision in the flange on the circumference side, which slit leads up to the target break section.

BRIEF DESCRIPTION OF THE DRAWINGS

Various exemplary embodiments of the invention are depicted in an exemplary manner in the appended schematic drawings.

DETAILED DESCRIPTION OF THE INVENTION

Figure 1:
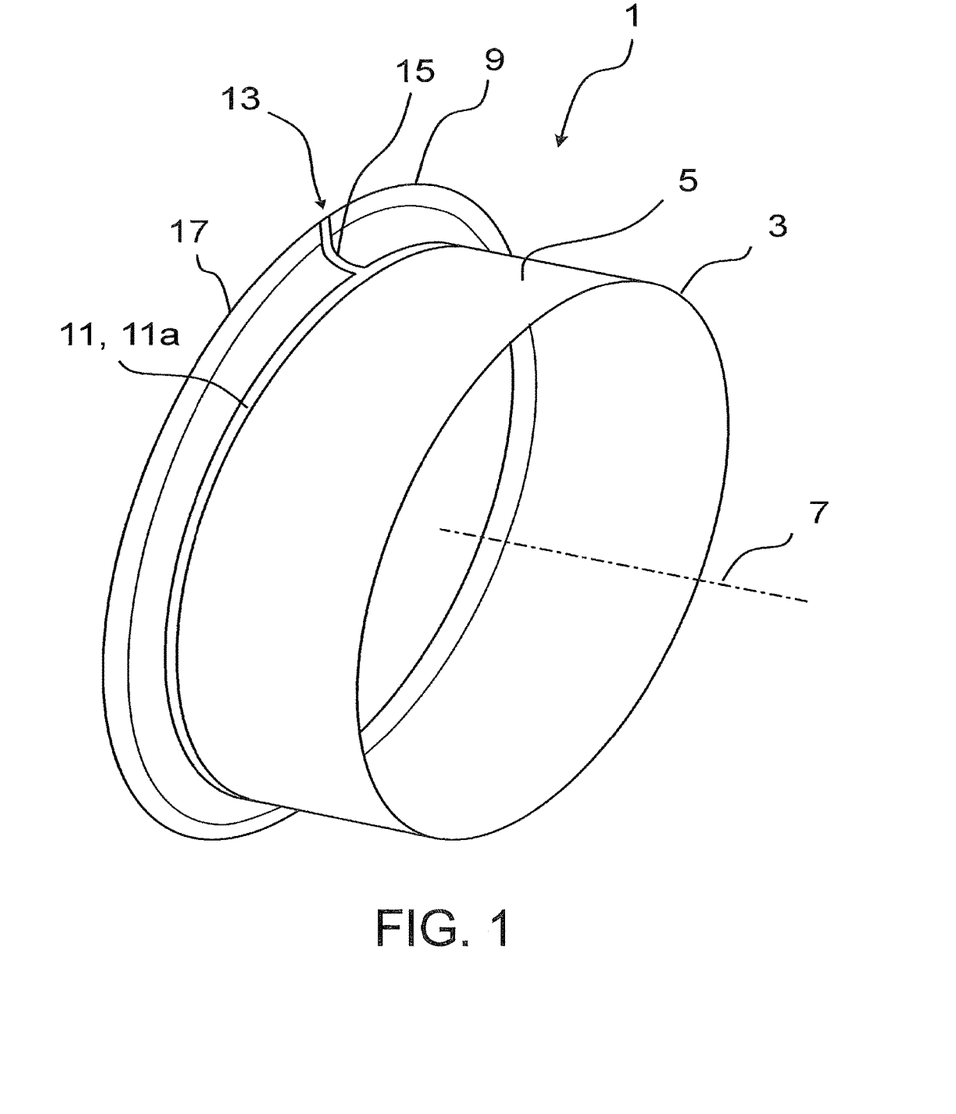
FIG. 1 shows a perspective view of a first embodiment of a wear-protective sleeve having a tearing apparatus.

The wear-protective sleeve 1 depicted in FIG. 1 includes a sleeve section 3 having a cylindrical sealing guide surface 5. The sleeve section 3 or its axis of symmetry 7 extends in an axial direction. A flange section 9 extends from the sleeve section 3. In the depicted exemplary embodiment, the flange section 9 extends outward from an edge of the sleeve section 3. The sleeve section 3 is connected with the flange section 9 via a target break section 11. The target break section 11 is formed to facilitate a separation of the flange section 9 from the sleeve section 3. In the depicted exemplary embodiment, the target break section 11 is formed as a circumferential groove 11a on the outer surface. The wear-protective sleeve 1 further has a tearing apparatus 13 provided on the flange section 9. The tearing apparatus 13 is formed to facilitate a radial tearing of the flange section 9 up to the target break section 11.

The embodiment of the tearing apparatus 13 depicted in FIG. 1 forms a reduced-wall-thickness path 15 in the flange section 9. The path 15 extends between circumferential edge 17 and target break section 11. In the exemplary embodiment shown, the tearing apparatus 13 or the path 15 is formed continuously from the circumferential edge 17 of the flange section 9 up to the target break section 11. The path 15 extends in a radial direction from outside towards inside. The path 15 opens into the target break section 11.

In the variant shown in FIG. 1, the tearing apparatus 13 or the reduced-wall-thickness path 15 is formed by a groove 19 introduced in the flange section 9.

Figure 2:
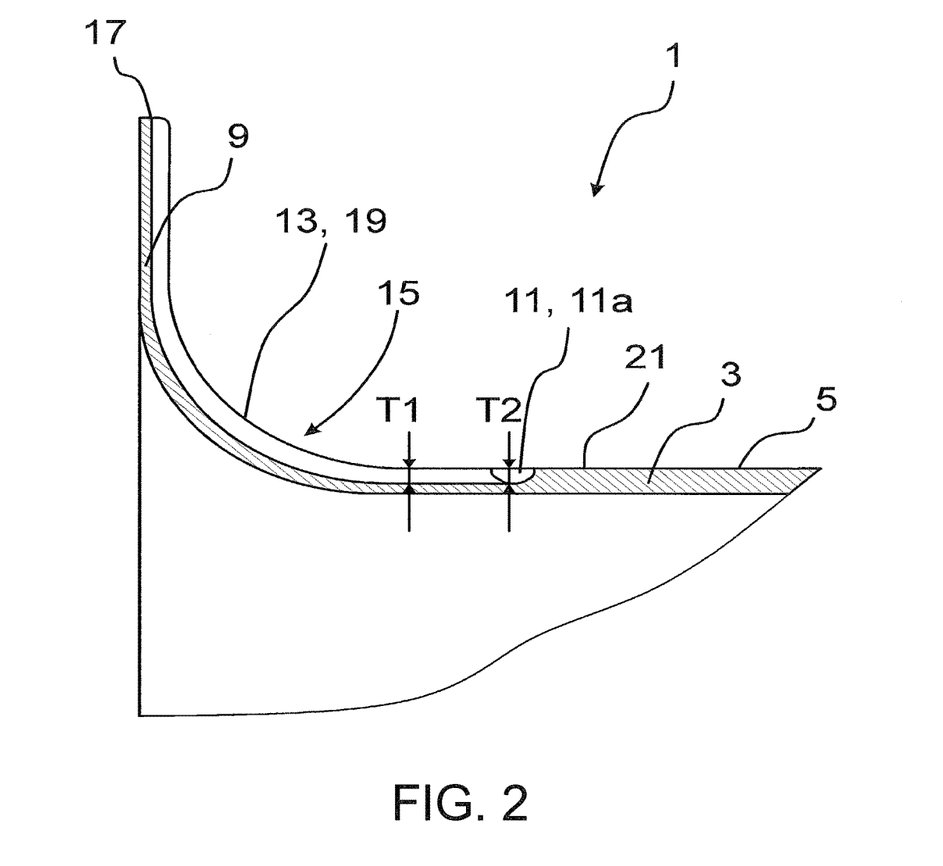
FIG. 2 shows a partial cross-sectional view of the first embodiment through the tearing apparatus according to the first embodiment according to FIG. 1.

The groove 19 is depicted in FIG. 2 in a partial cross-sectional view. FIG. 2 shows a part of the sleeve section 3 in cross-section with the target break section 11, which target break section is formed as annular groove 11a. The groove 19 introduced in the flange section 9 as tearing apparatus 13 has a depth T1, which corresponds to the depth T2 of the target break section 11 or the groove 11a in the surface 21 of the wear-protective sleeve 1. In this design the surface 21 forms the sealing guide surface 5. The groove 19 extends starting from the circumferential edge 17 of the flange section 9 up to the target break section 11 or into the groove IIa.

Figure 3:
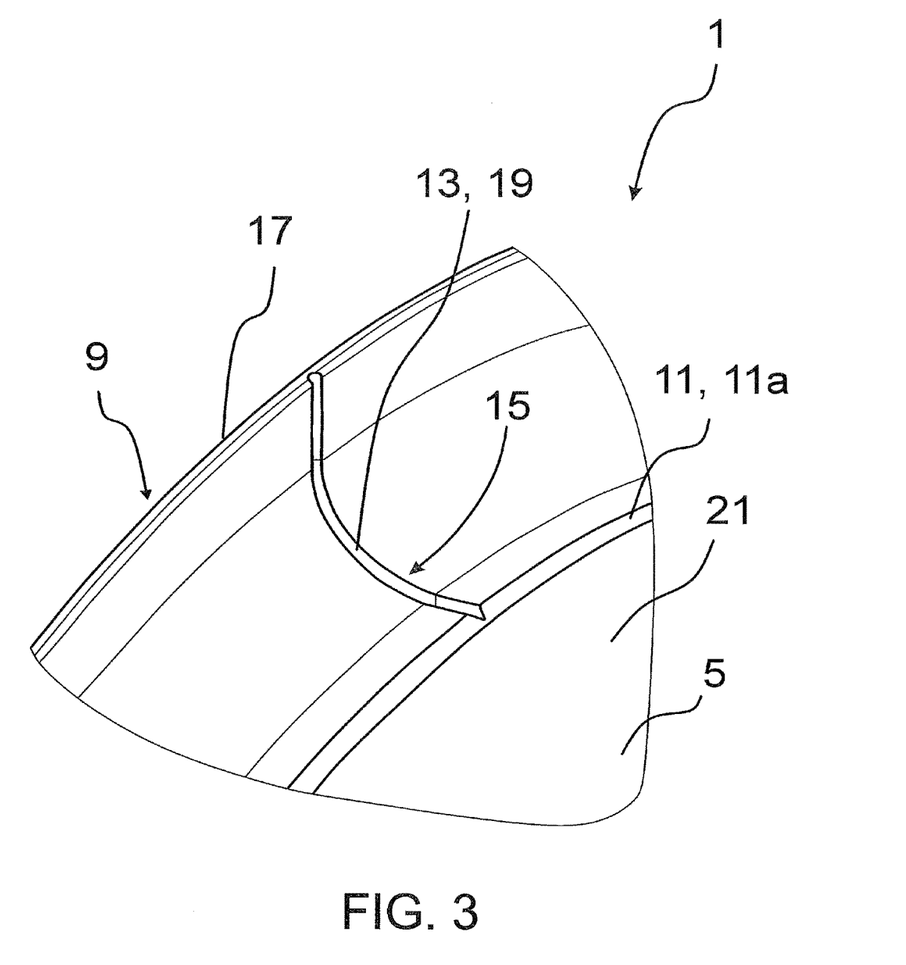
FIG. 3 shows an enlarged perspective partial view of the tearing apparatus according to the first embodiment according to FIG. 1.

In FIG. 3 the embodiment depicted in FIG. 2 is shown again in an enlarged, perspective partial view.

Figures 4A, 4B, 4C:
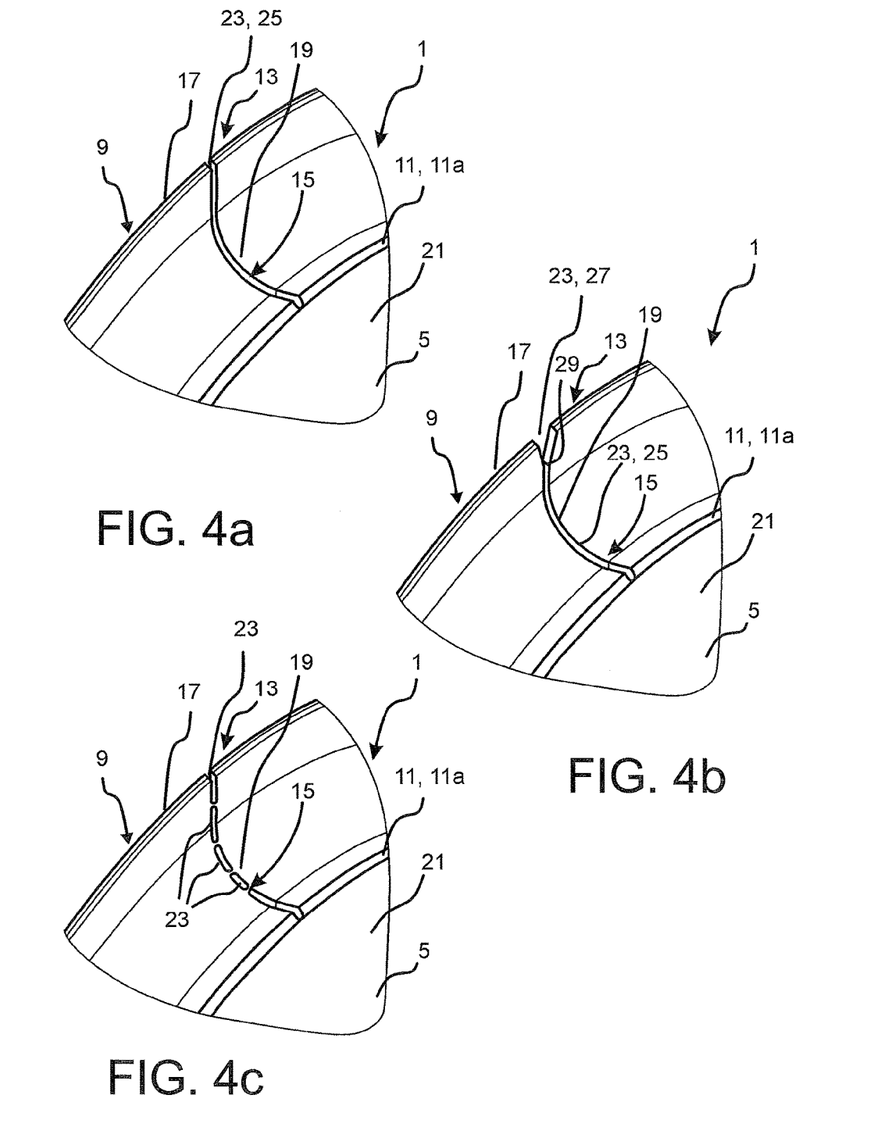
FIG. 4a-4d shows enlarged perspective partial views of modified embodiments of tearing apparatuses.

FIG. 4a shows a variant to the embodiment according to FIGS. 1 to 3. The tearing apparatus 13 according to FIG. 4a has a cutout 23. The cutout 23 is formed in this exemplary variant as a radially extending slit 25. The slit 25 is open at the edge, i.e. the circumferential edge 17 is interrupted by the slit 25. The slit 25 can extend up to the groove IIa. In other words the path 15 is formed as cutout 23 up to the groove 11a. The slit 25 can, however, also be formed over only a partial distance, for example half of the distance of the path 15 to the cutout 23, and finally merge into a groove 19 analogously to the design according to FIGS. 1 to 3.

FIG. 4b shows another variant to the embodiment according to FIG. 4a. The tearing apparatus 13 according to FIG. 4b has a notch 27 as cutout 23, which notch is introduced in the region of the circumferential edge 17 of the flange section 9. The notch 27 has a notch base 29, to which a reduced-wall-thickness path 15 and/or a cutout 23, in particular a slit 25 connects; the path 15 leads up to the target break section 11 or to the groove 11a. Instead of allowing the notch base 29 of the notch 27 to end in an upper or central region of the flange section 9 as depicted in FIG. 4c, the notch base 29 can be lowered to the target break section 11 or to the groove IIa.

Figure 4D:
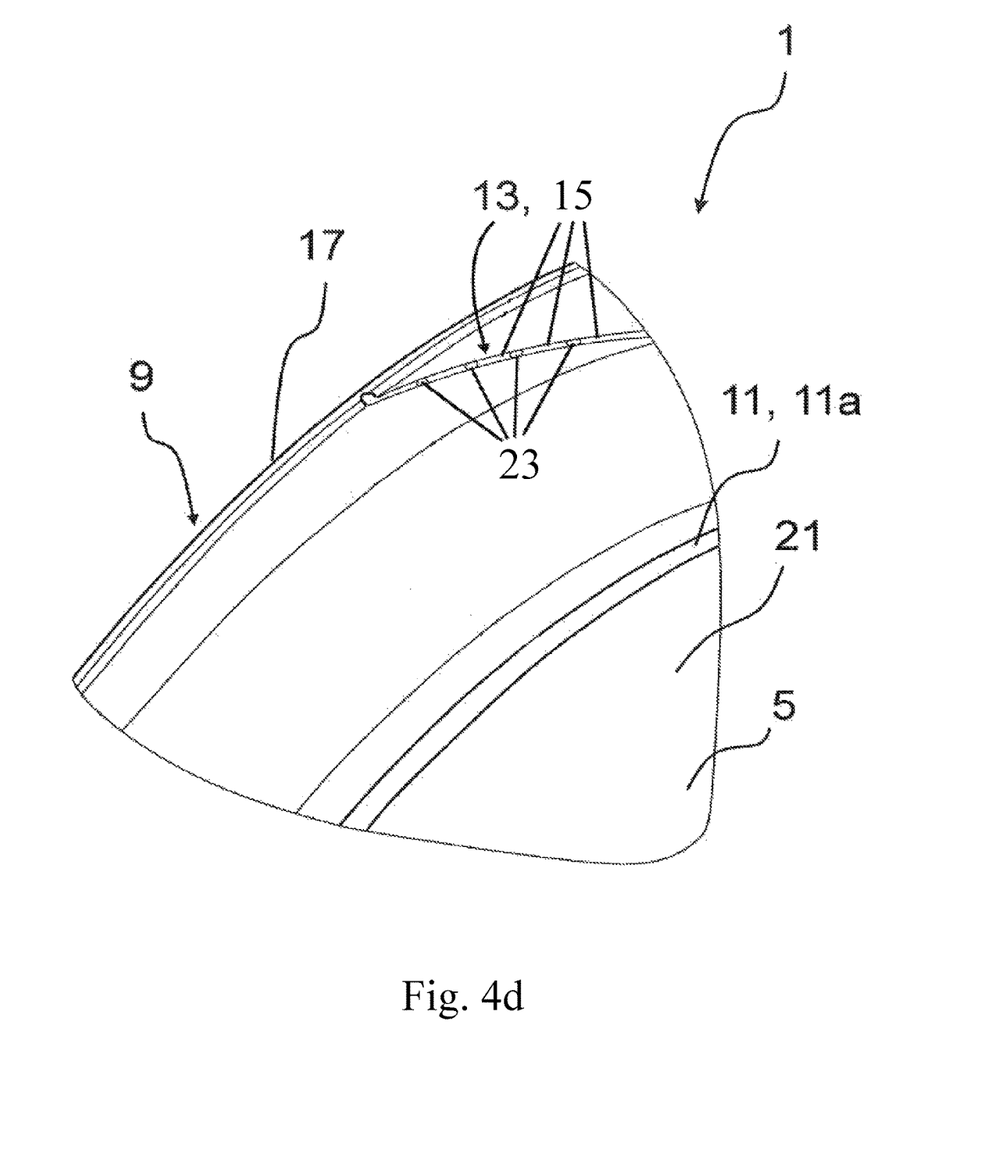

FIG. 4c shows a further variant to the embodiments according to FIG. 4a and FIG. 4b. The tearing apparatus 13 according to FIG. 4c has a plurality of cutouts 23, which are spaced from one another in a perforated manner. The cutouts 23 need not necessarily be formed as slots, but can alternatively for example be formed as circular holes. Instead of one, as depicted in FIG. 4c, open-at-the-edge edge cutout 31 closest to circumferential edge 17, a closed cutout 23 can be provided in the vicinity of a closed circumferential edge 17. In the embodiment shown in FIG. 4d, the tearing apparatus 13 has a plurality of reduced-wall-thickness paths 15 that alternate with a plurality of cutouts 23. Furthermore, the tearing apparatus 13 extends along a spiral-shaped path from the circumferential edge 17 of the flange section 9 to the target break section 11.

REFERENCE NUMBER LIST

1 Wear-protective sleeve
3 Sleeve section
5 Sealing guide surface
7 Axis of symmetry
9 Flange section
11 Target break section
IIa Annular groove
13 Tearing apparatus
15 Path
17 Circumferential edge
19 Groove
21 Surface
23 Cutout
25 Slit
27 Notch
29 Notch base
31 Edge cutout

The invention claimed is:

1. A wear-protective sleeve including:
a sleeve section extending axially and having a cylindrical sealing guide surface,
a flange section having a first portion extending radially away from the sleeve section and a second portion,
a target break section connecting the sleeve section to the flange section and being configured to facilitate separation of the flange section from the sleeve section, the second portion of the flange section extending axially between the first portion of the flange section and the target break section, and
a tearing apparatus defined in or on the flange section and having a plurality of reduced-wall-thickness paths and a plurality of cutouts in the flange section, wherein the plurality of reduced-wall thickness paths alternate with the plurality of cutouts such that no portion of the tearing apparatus has a thickness equal to a flange thickness, the tearing apparatus extends continuously between a circumferential edge of the flange section and the target break section such that the tearing apparatus opens into the target break section, the tearing apparatus being a spiral-shape path such that the tearing apparatus extends in a direction having a circumferential dimension, the tearing apparatus being configured to facilitate tearing of the flange section in a radial direction, an axial direction, and a circumferential direction up to the target break section to facilitate tearing of the flange from the sleeve section.

2. The wear-protective sleeve according to claim 1, wherein the plurality of reduced-wall-thickness paths are formed through embossing or ablating.

3. The wear-protective sleeve according to claim 1, wherein the tearing apparatus has an outer cutout at the circumferential edge of the flange section.

4. The wear-protective sleeve according to claim 3, wherein the outer cutout is a radially extending slit.

5. The wear-protective sleeve according to claim 3, wherein the outer cutout is a notch defined in the circumferential edge of the flange section.

6. The wear-protective sleeve according to claim 5, wherein the notch has a notch base, to which one of the plurality of reduced-wall-thickness paths connect.

7. The wear-protective sleeve according to claim 5, wherein the notch has a notch base extending up to the target break section.

8. The wear-protective sleeve according to claim 4, wherein the radially extending slit is an open-at-the-edge slit in the flange section.

9. A sleeve configured to be fitted onto a rotating shaft, the sleeve comprising:
a tubular portion extending in an axial direction and having a cylindrical-shaped sealing guide surface configured to contact a radial shaft seal,
a flange having a first portion extending outward from the tubular portion at least substantially in a radial direction that is perpendicular to the axial direction and having a second portion,
a first target break line defined between the tubular portion and the flange and being configured to facilitate separation of the flange from the tubular portion, the second portion of the flange extending axially between the first portion of the flange and the first target break line, and a second target break line defined in or on the flange and having a plurality of reduced-wall-thickness paths and a plurality of cutouts in the flange section, wherein the plurality of reduced-wall thickness paths alternate with the plurality of cutouts such that no portion of the second target break line has a thickness equal to a flange thickness, the second target break line extends continuously between a circumferential edge of the flange and the first target break line such that the second target break line opens into the first target break line, the second target break line being a spiral-shape path such that the second target break line extends in a direction having a circumferential dimension, the second target break line being configured to facilitate tearing of the flange in the radial direction, the axial direction, and a circumferential direction up to the first target break line to facilitate tearing of the flange from the tubular portion, and wherein the plurality of reduced-wall-thickness paths have a depth that corresponds to a depth of the first target break line.

\* \* \* \* \*